US010931896B2

(12) United States Patent
Matsumura et al.

(10) Patent No.: US 10,931,896 B2
(45) Date of Patent: Feb. 23, 2021

(54) IMAGE CAPTURE DEVICE AND IMAGE CAPTURE MANAGEMENT SYSTEM

(71) Applicant: FUJITSU LIMITED, Kawasaki (JP)

(72) Inventors: Masafumi Matsumura, Yokohama (JP); Ayumi Yonezawa, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/951,220

(22) Filed: Apr. 12, 2018

(65) Prior Publication Data

US 2018/0309942 A1 Oct. 25, 2018

(30) Foreign Application Priority Data

Apr. 20, 2017 (JP) .............................. JP2017-084048

(51) Int. Cl.
| | |
|---|---|
| *H04N 7/18* | (2006.01) |
| *H04N 5/355* | (2011.01) |
| *H04N 21/27* | (2011.01) |
| *H04N 5/369* | (2011.01) |
| *H04N 5/378* | (2011.01) |
| *G06K 9/20* | (2006.01) |

(52) U.S. Cl.
CPC .......... *H04N 5/355* (2013.01); *G06K 9/2063* (2013.01); *H04N 5/3696* (2013.01); *H04N 5/378* (2013.01); *H04N 21/27* (2013.01)

(58) Field of Classification Search
CPC ... G06T 2207/30204; G06T 7/73; G06T 7/74; G06T 2207/30108; G06T 7/70; G06T 7/80; G06T 2207/30164
USPC ........................................................ 348/136
See application file for complete search history.

(56) References Cited

U.S. PATENT DOCUMENTS

| | | | | |
|---|---|---|---|---|
| 9,423,872 | B2 * | 8/2016 | Kim ........................ G06F 3/013 |
| 9,797,777 | B2 * | 10/2017 | George-Svahn .......... G01J 5/02 |
| 2006/0256110 | A1 * | 11/2006 | Okuno ..................... G06F 3/012 |
| | | | | 345/419 |
| 2008/0292131 | A1 * | 11/2008 | Takemoto ............ H04N 13/246 |
| | | | | 382/100 |

(Continued)

FOREIGN PATENT DOCUMENTS

| | | |
|---|---|---|
| JP | 9-261607 A | 10/1997 |
| JP | 10-126668 A | 5/1998 |

(Continued)

OTHER PUBLICATIONS

Yang et al., Multiple marker tracking in a single-camera system for gait analysis 2013, IEEE International Conference, p. 3128-3131.*

(Continued)

*Primary Examiner* — Gims S Philippe
(74) *Attorney, Agent, or Firm* — Fujitsu Patent Center

(57) ABSTRACT

An image capture device includes a memory and a processor coupled to the memory. The processor is configured to acquire one or more patterns designating an image capture permitted range predetermined for each image capture object. The processor is configured to cause one or more frames corresponding to any of the one or more patterns to be displayed. The processor is configured to determine whether the image capture permitted range is satisfied based on a location relation between one or more elements of marker information specifying the location of the image capture object and the one or more frames to permit image capturing.

9 Claims, 11 Drawing Sheets

(56) References Cited

U.S. PATENT DOCUMENTS

| | | | | |
|---|---|---|---|---|
| 2011/0304646 | A1* | 12/2011 | Kato | A63F 13/10 |
| | | | | 345/632 |
| 2013/0088514 | A1* | 4/2013 | Breuss-Schneeweis | |
| | | | | G06T 19/006 |
| | | | | 345/633 |
| 2013/0100165 | A1* | 4/2013 | Komiyama | G09G 5/397 |
| | | | | 345/634 |
| 2013/0278635 | A1* | 10/2013 | Maggiore | G06T 19/006 |
| | | | | 345/633 |
| 2013/0286348 | A1 | 10/2013 | Makihira et al. | |
| 2016/0093058 | A1* | 3/2016 | Moteki | G06T 7/73 |
| | | | | 382/154 |
| 2017/0274691 | A1* | 9/2017 | Nakahara | B41J 29/38 |
| 2018/0227474 | A1* | 8/2018 | Kuwabara | H04N 5/232 |

FOREIGN PATENT DOCUMENTS

| | | |
|---|---|---|
| JP | 2002-199121 A | 7/2002 |
| JP | 2004-274245 A | 9/2004 |
| JP | 2009-299241 A | 12/2009 |
| JP | 2013-212314 A | 10/2013 |
| JP | 2014-235717 | 12/2014 |
| JP | 2015-141676 | 8/2015 |
| JP | 2017-55182 A | 3/2017 |

OTHER PUBLICATIONS

Japanese Office Action dated Sep. 29, 2020 for corresponding Japanese Patent Application No. 2017-084048, with English Translation, 10 pages.

* cited by examiner

FIG. 5

| USER ID | IMAGE CAPTURE PATTERN ID | AR MARKER ID |
|---|---|---|
| user00001 | PTN0001 | AR00001 |
| user00001 | PTN0001 | AR00002 |
| user00001 | PTN0001 | AR00003 |
| user00001 | PTN0001 | AR00004 |
| user00001 | PTN0002 | AR00001 |
| user00001 | PTN0002 | AR00002 |
| user00001 | PTN0002 | AR00005 |
| user00001 | PTN0002 | AR00006 |

FIG. 6

| AR MARKER ID | RACK ID | SIZE OF AR MARKER | LOCATION |
|---|---|---|---|
| AR00001 | RACK0001 | 20 | (180, 0) |
| AR00002 | RACK0001 | 20 | (180, 200) |
| AR00003 | RACK0001 | 20 | (80, 0) |
| AR00004 | RACK0001 | 20 | (80, 200) |
| AR00005 | RACK0001 | 20 | (130, 0) |
| AR00006 | RACK0001 | 20 | (130, 200) |

FIG. 7

| IMAGE CAPTURE PATTERN ID | VERTICAL SIZE | HORIZONTAL SIZE | LOCATION OF AR MARKER |
|---|---|---|---|
| PTN0001 | 100 | 200 | 1111 |
| PTN0002 | 50 | 200 | 1111 |
| PTN0003 | 50 | 200 | 1001 |
| PTN0004 | 50 | 200 | 1000 |
| ... | ... | ... | ... |

FIG. 9

| DEVICE INDIVIDUAL NUMBER | IMAGE CAPTURE DATA MANAGEMENT NUMBER |
|---|---|
| dev000001 | data000001 |
| dev000001 | data000002 |
| dev000001 | data000003 |
| dev000002 | data000004 |
| ... | ... |

IMAGE CAPTURE DEVICE AND IMAGE CAPTURE MANAGEMENT SYSTEM

CROSS-REFERENCE TO RELATED APPLICATION

This application is based upon and claims the benefit of priority of the prior Japanese Patent Application No. 2017-084048, filed on Apr. 20, 2017, the entire contents of which are incorporated herein by reference.

FIELD

The embodiments discussed herein are related to an image capture device, an image capture management system, and a non-transitory computer-readable recording medium having stored therein an image capture control program.

BACKGROUND

There is known a technology which captures an object attached with an augmented reality (AR) marker, and superimposes augmented information, for example, a guidance indication assisting an operation of the object, on the object and displays the augmented information. There is known a technology which excludes an area other than the object in the captured image from an interpretation object at this time. In the technology, the marker is identified rather than the captured image, and an object corresponding to the marker, an area, and a positional posture of the object are estimated, and the object, the area, and the positional posture of the object are tracked and estimated based on the estimation result and its own estimation result without depending on the marker. Further, in the technology, when both estimations are performed, the area other than the object is excluded from the interpretation object, and AR is indicated based on the estimation result by using disposition information on the object pre-related to the marker.

There is also known a technology which is capable of easily and appropriately selecting a user who may read a virtual object displayed based on an AR marker. The technology uses a user information table in which user information including the location of a user is registered for each user, and a virtual object information table in which virtual object information including the location and direction of a virtual object is registered for each virtual object. Further, in the technology, based on the location and direction of a virtual object of interest and the location of a user, a user included in a predetermined reading range in a front direction of the displayed virtual object of interest is registered as a reading user of the virtual object of interest.

Related technologies are disclosed in, for example, Japanese Laid-Open Patent Publication No. 2014-235717 and Japanese Laid-Open Patent Publication No. 2015-141676.

SUMMARY

According to an aspect of the embodiments, provided is an image capture device including a memory and a processor coupled to the memory. The processor is configured to acquire one or more patterns designating an image capture permitted range predetermined for each image capture object. The processor is configured to cause one or more frames corresponding to any of the one or more patterns to be displayed. The processor is configured to determine whether the image capture permitted range is satisfied based on a location relation between one or more elements of marker information specifying the location of the image capture object and the one or more frames to permit image capturing.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 5 is a diagram illustrating an example of a user information master according to the first embodiment;

FIG. 6 is a diagram illustrating an example of an AR marker management master according to the first embodiment;

FIG. 7 is a diagram illustrating an example of an image capture pattern master according to the first embodiment;

FIG. 9 is a diagram illustrating an example of an image capture data management master according to the first embodiment;

DESCRIPTION OF EMBODIMENTS

In an area, such as a data center, requiring strict security, there is a case where an image of a subject, such as a server rack, is captured for repair and maintenance of the device. The image capture area of the server rack provided in the data center may include an area (for example, a server of another company) that is not suitable for image capturing. However, in the conventional technology, it is impossible to capture an image of an object while excluding an area that is prohibited from being captured from an image capture object.

Hereinafter, embodiments of an image capture device, an image capture management system, and a non-transitory computer-readable recording medium having stored therein an image capture control program will be described in detail with reference to the drawings. Further, the present disclosure is not limited by the embodiments. Further, the respective embodiments provided below may be appropriately combined with each other within the range not causing a contraction.

First Embodiment

Figure 1:
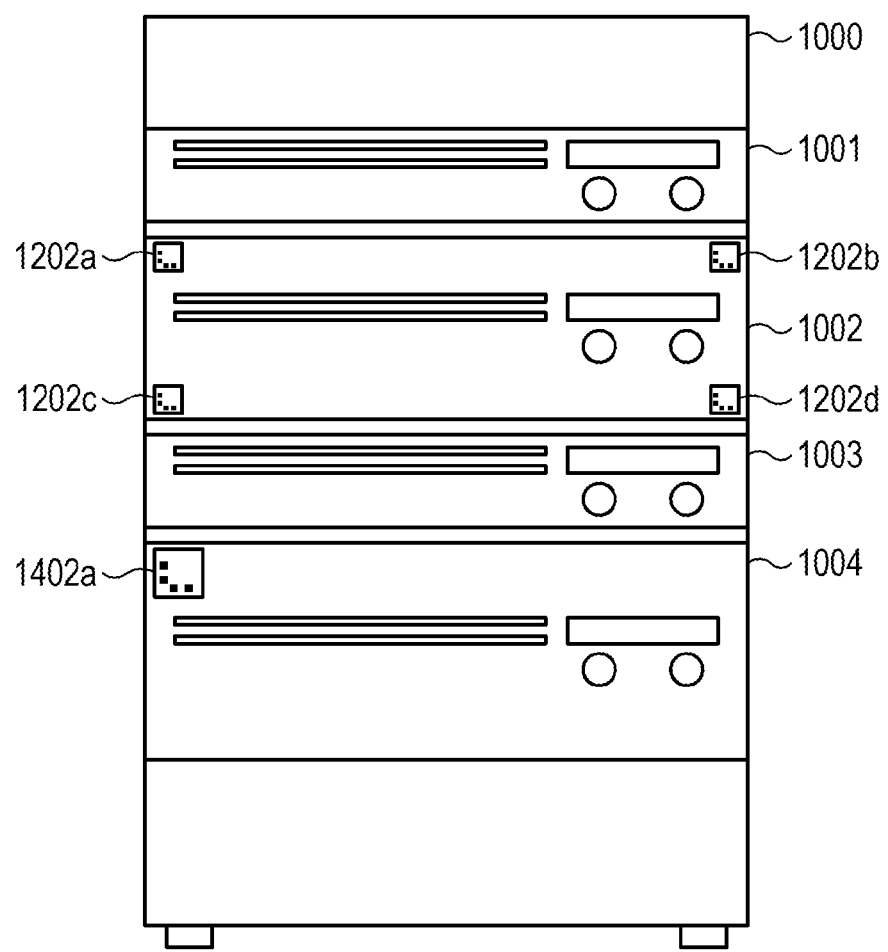
FIG. 1 is a diagram illustrating an example of a server rack of an image capture object according to a first embodiment.

An image capture management system in the present embodiment manages image capturing of an area or an object such as, for example, a server provided in a server rack of a data center, of which security is strictly managed. In the present embodiment, a server to be captured is attached with, for example, an augmented reality (AR) marker as illustrated in FIG. 1. The AR marker attached to the server regulates an image capture available area in the image capture management system 1. Further, the AR marker is an information code, for example, a quick response (QR) code (registered trademark), but is not limited thereto. Further, the AR marker may also include information on an AR marker ID to be described below.

FIG. 1 is a diagram illustrating an example of a server rack of an image capture object according to the first embodiment. FIG. 1 illustrates a server rack 1000 in which a plurality of servers 1001 to 1004 are provided. Among them, AR markers 1202a to 1202d are attached to the server rack 1002. Further, an AR marker 1402a is also attached to the server 1004.

<Functional Block>

Figure 2:
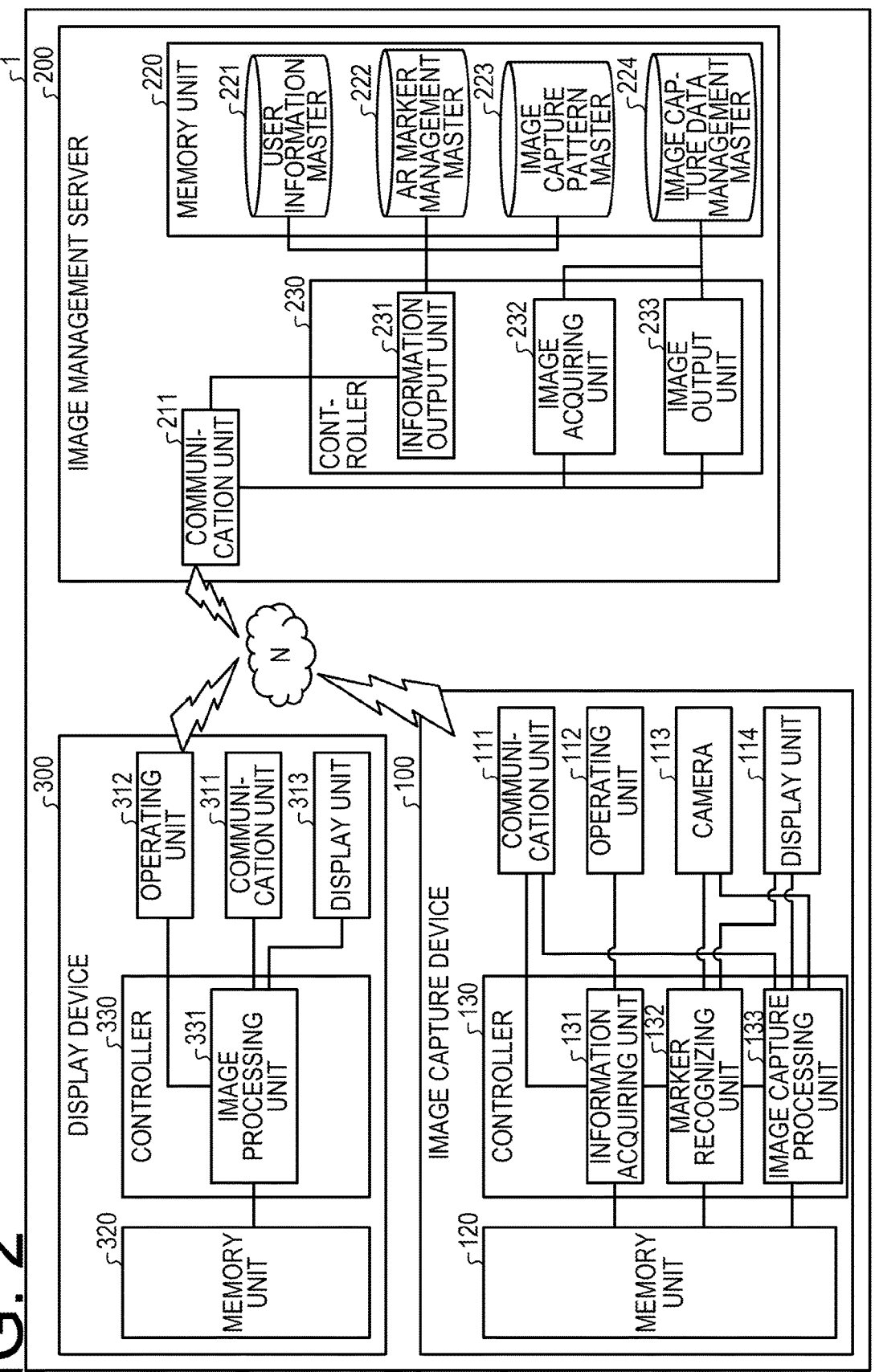
FIG. 2 is a diagram illustrating an example of an image capture management system according to the first embodiment.

Next, the image capture management system 1 in the present embodiment will be described with reference to FIG. 2. FIG. 2 is a diagram illustrating an example of the image capture management system according to the first embodiment. As illustrated in FIG. 2, the image capture management system 1 in the present embodiment includes an image capture device 100, an image management server 200, and a display device 300. The image capture device 100, the image management server 200, and the display device 300 are connected to be capable of communicating with one another via, for example, a network N.

The image capture device 100 captures an image of an area or an object illustrated in FIG. 1, and transmits data of the captured image to the image management server 200. The image management server 200 displays the image obtained from the image capture device 100 based on a display demand from the display device 300. In this case, the image capture device 100 acquires an image capture pattern including information on a range permitted to be captured from the image management server 200, and captures the image only when an image capture object matches the image capture pattern. Further, in response to the display demand from the display device 300, the image management server 200 transmits the image, of which the display is permitted corresponding to the display device 300, to the display device 300 as data in a manner in which duplication is impossible which is to be described below.

In the image capture management system 1 illustrated in FIG. 2, the image capture device 100 is lent to, for example, a user (not illustrated) so as to capture only a position matching a predetermined image capture pattern within the data center. Further, the display device 300 is lent to, for example, a limited user (not illustrated), such as a repair manager of the data center in order to prevent an image from being leaked.

The image capture device 100 includes a communication unit 111, an operating unit 112, a camera 113, a display unit 114, a memory unit 120, and a controller 130. The image capture device 100 is implemented by a portable computer, for example, a smart phone, but is not limited thereto, and may be implemented by an image capture device, such as a digital camera.

The communication unit 111 is implemented by, for example, a network interface card (NIC). The communication unit 111 controls the communication with other computers, such as the image management server 200 and the display device 300, via the network N.

The operating unit 112 is an input device receiving various operations from the user of the image capture device 100, and is, for example, a keyboard or a mouse. The operating unit 112 outputs an operation input by the user to the controller 130 as operation information.

The camera 113 captures an area or an image of an object based on an instruction output from the controller 130. The camera 113 outputs data of the captured image to the controller 130.

The display unit 114 is a display device for displaying various elements of information, and is a display device, for example, a liquid crystal display. The display unit 114 displays various images, such as a captured image output from the controller 130. Further, the operating unit 112 and the display unit 114 may be integrated and implemented by, for example, a touch panel.

The memory unit 120 stores various elements of data, for example, a program executed by the controller 130, image data input from the camera 113, and data received from the image management server 200. The memory unit 120 corresponds to a semiconductor memory device, such as a random access memory (RAM), a read only memory (ROM), a flash memory, or a memory device, such as a hard disk drive (HDD).

Next, the controller 130 is a processing unit handling overall processing of the image capture device 100. The controller 130 is implemented, for example, by executing a program stored in an internal memory device in a RAM as a work area by, for example, a central processing unit (CPU), or a micro processing unit (MPU). Further, the controller 130 may be implemented by, for example, an integrated circuit, such as an application specific integrated circuit (ASIC) or a field programmable gate array (FPGA). The controller 130 includes an information acquiring unit 131, a marker recognizing unit 132, and an image capture processing unit 133. Further, the information acquiring unit 131, the marker recognizing unit 132, and the image capture processing unit 133 are examples of electronic circuits of a processor or examples of processes executed by a processor.

The information acquiring unit 131 acquires information used for image capturing. For example, when the information acquiring unit 131 receives an image capture instruction from the user (not illustrated) through the operation unit 112, the information acquiring unit 131 requires information used for image capturing corresponding to information on the user, which is to be described below, from the image management server 200 through the communication unit 111. The information acquiring unit 131 acquires, for example, information on an image capture pattern and information on an AR marker attached to the object, which are to be described below, from the image management server 200, stores the acquired information in the memory unit 120, and outputs the information to the marker recognizing unit 132. Further, the information acquiring unit 131 may receive an input of a user ID via the operation unit 112 and transmit the received user ID in accordance with a request for information used for image capturing.

The marker recognizing unit 132 recognizes the AR marker attached to the object and determines whether the recognized AR marker matches the image capture pattern. When the marker recognizing unit 132 acquires the information on the image capture pattern and the information on the AR marker from the information acquiring unit 131, the marker recognizing unit 132 displays the image acquired from the camera 113 on the display unit 114. Further, when the marker recognizing unit 132 acquires information on a plurality of image capture patterns, the marker recognizing unit 132 receives a selection of a specific image capture pattern from the user via the operating unit 112. The marker recognizing unit 132 displays a captured image including a frame corresponding to the selected image capture pattern on the display unit 114. Further, hereinafter, the frame corresponding to the image capture pattern may be indicated by a "recognition frame."

Figure 3:
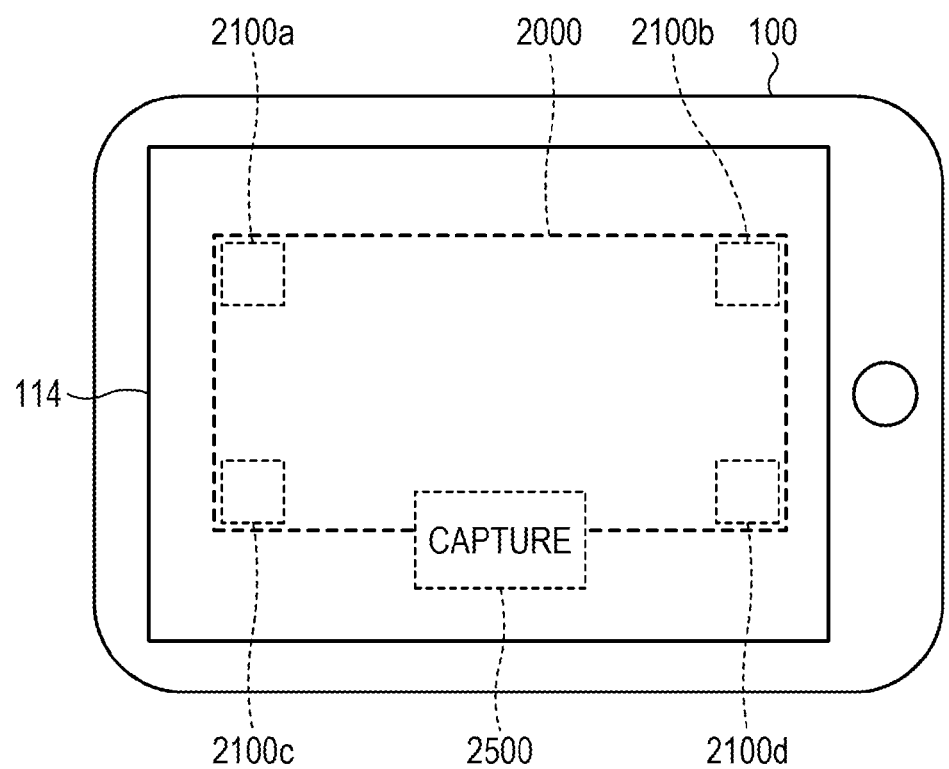
FIG. 3 is a diagram illustrating an example of an image capture device displaying a captured image according to the first embodiment.

An example of a captured image displayed by the marker recognizing unit 132 on the display unit 114 will be described with reference to FIG. 3. FIG. 3 is a diagram illustrating an example of the image capture device displaying a captured image according to the first embodiment. As illustrated in FIG. 3, the marker recognizing unit 132 displays a captured image including an image capture pattern 2000, recognition frames 2100a to 2100d, and an image capture button 2500 on the display unit 114. Further, the image capture button 2500 may be configured not to be displayed in the captured image, such as a case where the operating unit 112 and the display unit 114 are implemented by the devices, respectively.

Referring back to FIG. 2, when the marker recognizing unit 132 receives an output of the image captured by the camera 113, the marker recognizing unit 132 recognizes an AR marker attached to an object included in the image. Next, the marker recognizing unit 132 determines whether the recognized AR marker is an AR marker specified in the image capture pattern which is to be described later, and whether the recognized AR marker is included in the recognition frame. When the marker recognizing unit 132 determines that all of the AR markers specified in the image capture pattern are included in the recognition frames, the marker recognizing unit 132 outputs an image capture permission instruction to the image capture processing unit 133.

Next, the image capture processing unit 133 captures a range included in the image capture pattern. When the image capture processing unit 133 receives the output of the image capture permission instruction from the marker recognizing unit 132, the image capture processing unit 133 activates the image capture button 2500 in the captured image illustrated in FIG. 2 and stands by until the image capture button 2500 is operated by the user. Further, when the image capture button 2500 is not displayed in the captured image, the image capture processing unit 133 may be configured to activate an operation of an image capture switch (not illustrated) and stand by until the image capture switch is operated by the user.

When the image capture processing unit 133 receives the operation of the image capture button 2500 via the operating unit 112, the image capture processing unit 133 captures the range included in the image capture pattern and stores data of the captured image in the memory unit 120. Then, the image capture processing unit 133 transmits the data of the captured image to the image management server 200 via the communication unit 111.

The image capture processing unit 133 may be configured to delete the data of the image stored in the memory unit 120 when the data of the captured image is transmitted, in order to prevent the data of the image from the image capture device 100 from being leaked.

Figure 4:
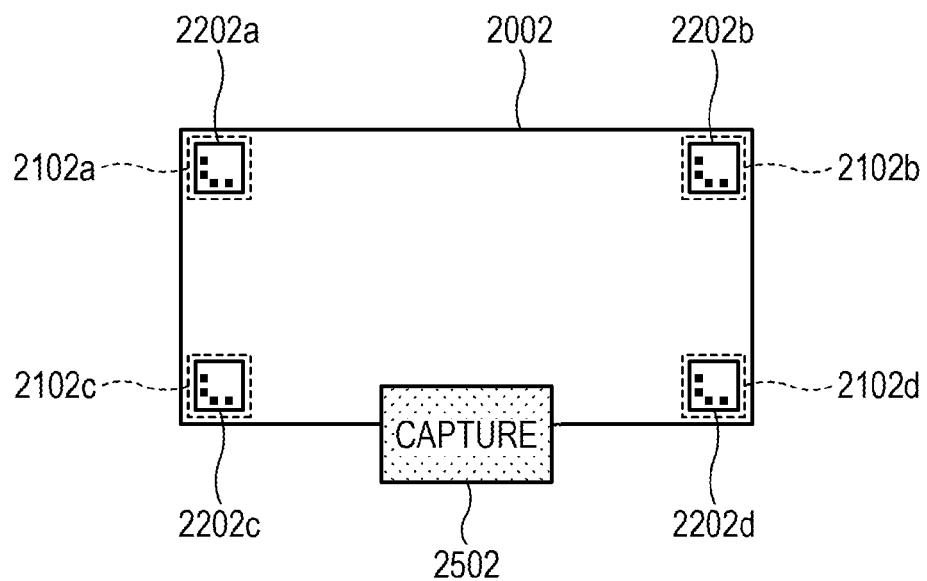
FIG. 4 is a diagram illustrating an example of an image shift according to the first embodiment.

Processing for the determination of the AR marker by the marker recognizing unit 132 and processing for the image capture permission by the image capture processing unit 133 will be described with reference to FIG. 4. FIG. 4 is a diagram illustrating an example of an image shift according to the first embodiment. As illustrated in a captured image 2001 of FIG. 4, AR markers 2201a and 2201c are included in the captured image 2001, but are not included in the recognition frames 2101a and 2101c, respectively. Further, AR markers 2201b and 2201d are not included in the captured image 2001. In this case, the marker recognizing unit 132 determines that all of the AR markers specified in the image capture pattern are not included in the recognition frames, so that the marker recognizing unit 132 does not output an image capture permission instruction to the image capture processing unit 133. Accordingly, an image capture button 2501 of the captured image 2001 is not activated.

In the meantime, in a captured image 2002 of FIG. 4, all of the AR markers 2202a to 2202d are included in recognition frames 2102a to 2102d, respectively. In this case, the marker recognizing unit 132 determines that all of the AR markers specified in the image capture pattern are included in the recognition frames, and outputs the image capture permission instruction to the image capture processing unit 133. Accordingly, the image capture processing unit 133 activates an image capture button 2502 of the captured image 2002.

Next, a function of the image management server 200 in the present embodiment will be described. As illustrated in FIG. 2, the image management server 200 in the present embodiment includes a communication unit 211, a memory unit 220, and a controller 230.

The communication unit 211 controls communication with other computers, such as the image capture device 100 and the display device 300, via the network N.

The memory unit 220 stores various data, such as a program executed by the controller 230. Further, the memory unit 220 includes a user information master 221, an AR marker management master 222, an image capture pattern master 223, and an image capture data management master 224. The memory unit 220 corresponds to a semiconductor memory device, such as a RAM, a ROM, and a flash memory, or a memory device, such as a hard disk drive (HDD).

The user information master 221 stores information on an image capture pattern permitted to be captured by the user. FIG. 5 is a diagram illustrating an example of the user information master according to the first embodiment. As illustrated in FIG. 5, the user information master 221 associates an "image capture pattern ID" and an "AR marker ID" with a "user ID" and stores the "image capture pattern ID" and the "AR marker ID." Further, for example, information stored in the user information master 221 is pre-input by a manager (not illustrated) of the image management server 200.

In FIG. 5, the "user ID" is an identifier (ID) uniquely identifying the user (not illustrated) of the image capture device 100. The "image capture pattern ID" is an ID uniquely identifying an image capture pattern. The "AR marker ID" is an ID uniquely identifying an AR marker given to a server.

The user information master 221 illustrated in FIG. 5 stores that an image capture pattern of an image capture pattern ID stored in association with a user ID is permitted to be captured by a user of the user ID. In the example of the ID in FIG. 5, it is indicated that a user with a user ID "user00001" is permitted to capture with the image capture patterns of the image capture pattern IDs "PTN0001" and "PTN0002".

The user information master 221 illustrated in FIG. 5 stores that an image capture object of an image capture pattern corresponding to an image capture pattern ID includes a portion to which an AR marker corresponding to the image capture pattern ID is given. For example, both an image capture pattern of an image capture pattern ID "PTN0001" and an image capture pattern of an image capture pattern ID "PTN0002" have ranges including portions to which AR marker IDs "AR00001" and "AR00002" are given as an image capture range. Further, the image capture pattern of the image capture pattern ID "PTN0001" includes portions to which AR marker IDs "AR00003" and "AR00004" are given in the image capture range. In addition, the image capture pattern of the image capture pattern ID "PTN0002" includes portions to which AR marker IDs "AR00005" and "AR00006" are given in the image capture range.

Next, the AR marker management master 222 stores information on the AR marker given to the object. FIG. 6 is a diagram illustrating an example of the AR marker management master according to the first embodiment. As illustrated in FIG. 6, the AR marker management master 222 associates a "rack ID," an "AR marker size," and a "position" with an "AR marker ID" and stores the "rack ID," the "AR marker size," and the "position." Further, for example, the information stored in the AR marker management master 222 is pre-input by the manager (not illustrated) of the image management server 200.

In FIG. 6, the "rack ID" is an ID uniquely identifying a rack provided with a server to which an AR marker is given. The "AR marker size" represents a size of the AR marker. For example, when the AR marker is a square, the AR marker size stores a length of one side of the AR marker.

In FIG. 6, the "position" is a position to which the AR marker is given. In the example illustrated in FIG. 6, the "position" stores coordinates indicating a position from a left-lower end of the server rack. For example, coordinates of the AR marker ID "AR00004" are set at a position of 80 cm in height and 200 cm on the right side. In the meantime, coordinates of the AR marker ID "AR00006" are set at a position of 130 cm in height and 200 cm on the right side.

Referring back to FIG. 2, the image capture pattern master 223 stores information on the size of the image capture pattern and information on the position of the AR marker included in the image capture pattern. FIG. 7 is a diagram illustrating an example of the image capture pattern master according to the first embodiment. As illustrated in FIG. 7, the image capture pattern master 223 associates a "vertical size," "horizontal size," and "AR marker position" with the "image capture pattern ID," and stores the "vertical size," "horizontal size," and "AR marker position." Further, for example, information stored in the image capture pattern master 223 is pre-input by the manager (not illustrated) of the image management server 200.

In FIG. 7, the "vertical size" and "horizontal size" indicate a dimension of the image capture pattern. For example, in FIG. 7, the image capture pattern master 223 stores that the dimension of the image capture pattern of the image capture pattern ID "PTN0001" is 100 cm in length and 200 cm in width, and the dimensions of the image capture patterns of the image capture pattern IDs "PTN0002" to "PTN0004" are 50 cm in length and 200 cm in width.

In FIG. 7, the "AR marker position" indicates a position to which the AR marker is given in the image capture pattern. Bits of the "AR marker position" correspond to a left-upper corner, a right-upper corner, a left-lower corner, and a right-lower corner within the image capture pattern, respectively.

Figure 8:
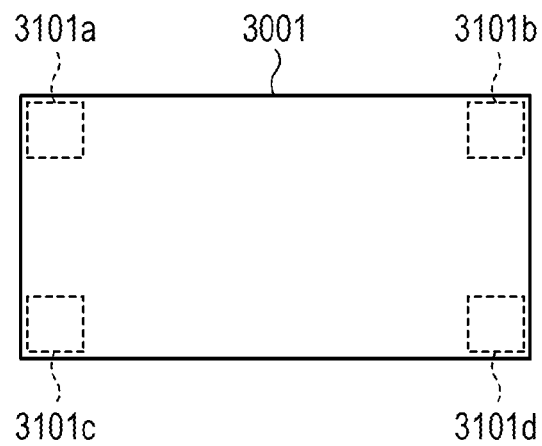
FIG. 8 is a diagram illustrating an example of a captured image corresponding to each image capture pattern according to the first embodiment.
Figure 8:
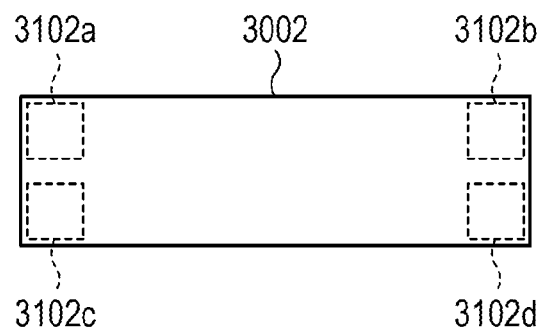
Figure 8:
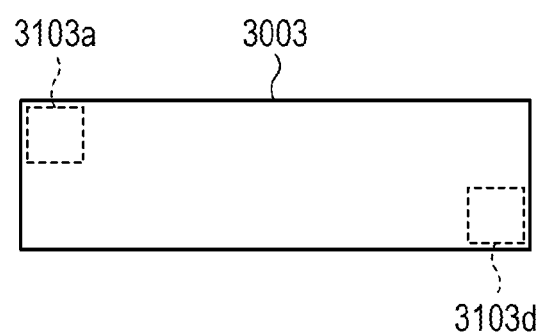
Figure 8:
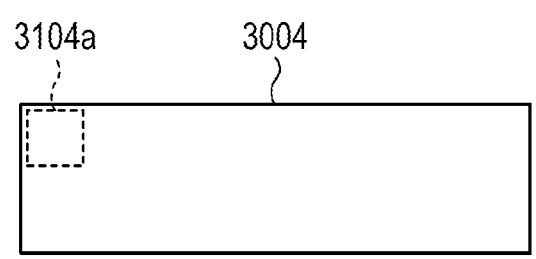

An example of a captured image corresponding to the image capture pattern illustrated in FIGS. 6 and 7 will be described with reference to FIG. 8. FIG. 8 is a diagram illustrating an example of a captured image corresponding to each image capture pattern according to the first embodiment. In FIG. 8, captured images 3001 to 3004 correspond to the image capture pattern IDs "PTN0001" to "PTN0004" indicated in the image capture pattern illustrated in FIG. 7, respectively. Further, in the captured images 3001 to 3004, the illustration of the image capture button 2500 illustrated in FIG. 3 is omitted.

As illustrated in FIG. 8, in the captured images 3001 to 3004, recognition frames corresponding to the positions to which the AR markers are given in the image capture pattern are indicated. For example, in the captured image 3001 corresponding to the image capture pattern ID "PTN0001," recognition frames 3101a to 3101d are indicated at all of the four corners. Similarly, in the captured image 3002 corresponding to the image capture pattern ID "PTN0002," recognition frames 3102a to 3102d are indicated. In the meantime, in the captured image 3003 corresponding to the image capture pattern ID "PTN0003," recognition frames 3103a to 3103d are indicated at only two points on a diagonal line of the left-upper corner and the right-lower corner. Further, in the captured image 3004 corresponding to the image capture pattern ID "PTN0004," a recognition frame 3104a is indicated at only one point of the left-upper corner. Further, as illustrated in FIG. 8, a height of the captured image 3001 corresponding to "PTN0001" is two times a height of each of the captured images 3002 to 3004 corresponding to "PTM0002" to "PTN0004," respectively.

As described with reference to FIGS. 6 to 8, the dimension of the image capture pattern and the position to which the AR marker is given may be randomly changed. Further, in the present embodiment, the example in which the AR marker is given to the four corners within the image capture pattern has been described, but the embodiment is not limited thereto. For example, the AR marker may be configured to be given to a center of the image capture pattern, that is, the image capture pattern may be configured to have a predetermined dimension of the AR marker in up, down, left, and right directions as the image capture range.

Referring back to FIG. 2, the image capture data management master 224 stores information on the data of the image which is permitted to be displayed on the display device 300 and is acquired from the image capture device 100. FIG. 9 is a diagram illustrating an example of the image capture data management master according to the first embodiment. As illustrated in FIG. 9, the image capture data management master 224 associates a "device individual number" with an "image capture data management number" and stores the "device individual number" and the "image capture data management number." Further, for example, the information stored in the image capture data management master 224 is pre-input by the manager (not illustrated) of the image management server 200.

In FIG. 9, the "device individual number" is a number uniquely identifying the display device 300 requesting to display the image. The "image capture data management number" is a number uniquely identifying the data of the image acquired from the image capture device 100. In the example illustrated in FIG. 9, the image capture data management master 224 stores that the display of images for data of the image capture data management numbers "data000001" to "data000003" is permitted to the display device 300 of the device individual number "dev0001."

Referring back to FIG. 2, the controller 230 is a processing unit handling overall processing of the image management server 200. The controller 230 is implemented, for example, by executing a program stored in an internal memory device in a RAM as a work area by, for example, a CPU, or an MPU. Further, the controller 230 may be implemented by, for example, an integrated circuit, such as an ASIC or an FPGA. The controller 230 includes an information output unit 231, an image receiving unit 232, and an image output unit 233. Further, the information output unit 231, the image receiving unit 232, and the image output unit 233 are examples of electronic circuits of a processor or examples of processes executed by a processor.

The information output unit 231 outputs information on the image capture pattern to the image capture device 100. For example, when the information output unit 231 receives the request for the information used for image capturing from the image capture device 100 via the communication unit 211, the information output unit 231 specifies a user ID of the user of the image capture device 100. The information output unit 231 extracts an image capture pattern ID corresponding to the specified user ID by referring to the user information master 221. Further, the information output unit 231 refers to the AR marker management master 222 and the image capture pattern master 223, acquires information on an image capture pattern and an AR code related to the extracted image capture pattern ID, and transmits the acquired information to the image capture device 100 via the communication unit 211. Further, when the information output unit 231 receives the request for the information used for image capturing including the user ID from the image capture device 100, the information output unit 231 may extract the image capture pattern ID by using the received user ID.

The image receiving unit 232 stores information on the image received from the image capture device 100. When the image receiving unit 232 receives the image in a target range included in the image capture pattern from the image capture device 100 via the communication unit 211, the image receiving unit 232 stores image data in the memory unit 220. Further, the image receiving unit 232 gives an image capture data management number to the received image, and associates the image capture data management number with a device individual number related to the display device 300 which is permitted to display the image, and stores the image capture data management number in the image capture data management master 224.

Next, the image output unit 233 transmits the image to the display device 300. When the image output unit 233 receives a request for displaying the image from the display device 300 via the communication unit 211, the image output unit 233 specifies the device individual number of the display device 300. The image output unit 233 extracts the image capture data management number corresponding to the specified device individual number by referring to the image capture data management master 224. Further, the image output unit 233 reads the data of the image corresponding to the extracted image capture data management number from the memory unit 220, and transmits the read data to the display device 300 via the communication unit 211. Further, when the image output unit 233 receives a request for displaying the image including the device individual number from the display device 300, the image output unit 233 may extract the image capture data management number by using the received device individual number.

When the image output unit 233 transmits the data of the image to the display device 300, the image output unit 233 may transmit the image as data that cannot be duplicated on the display device 300. For example, when a dedicated application (application software) that does not permit the duplication of an image is installed in the display device 300, the image output unit 233 may convert the data of the image into a format that may be displayed by the dedicated application, and transmit the converted data.

Next, the function of the display device 300 in the present embodiment will be described. As illustrated in FIG. 2, the display device 300 in the present embodiment includes a communication unit 311, an operating unit 312, a display unit 313, a memory unit 320, and a controller 330. The display device 300 in the present embodiment is implemented by, for example, a smart phone or a computer, such as a personal computer (PC).

The display device 300 may be configured to suppress the duplication of an image to be displayed in order to prevent the image from being leaked. For example, the display device 300 may be a device, such as a head mount display (HMD), which does not have a duplication function, and further, may be a computer in which a dedicated application that does not permit the duplication of an image is installed.

The communication unit 311 controls communication with other computers, such as the image capture device 100 and the image management server 200, via the network N.

The operating unit 312 is an input device which receives various operations from the user of the display device 300, and is, for example, a keyboard or a mouse. The operating unit 312 outputs the operation input by the user to the controller 330 as operation information.

The display unit 313 is a display device for displaying various elements of information, and is, for example, a display device, such as a liquid crystal display. The display unit 313 displays the data of the image output from, for example, the controller 330. Further, the operating unit 312 and the display unit 313 may be integrated and implemented by, for example, a touch panel.

For example, the memory unit 320 stores various data, such as a program executed by the controller 330. Further, the memory unit 320 stores the data of the image received from the image management server 200. The memory unit 320 corresponds to a semiconductor memory device, such as a RAM, a ROM, and a flash memory, or a memory device, such as a hard disk drive (HDD).

The controller 330 is a processing unit handling overall processing of the display device 300. The controller 330 is implemented, for example, by executing a program stored in an internal memory device in a RAM as a work area by, for example, a CPU or an MPU. Further, the controller 330 may be implemented by, for example, an integrated circuit, such as an ASIC or an FPGA. The controller 330 includes an image processing unit 331. Further, the image processing unit 331 is an example of an electronic circuit of a processor or an example of a process executed by a processor.

The image processing unit 331 requests the acquirement of the data of the image, and displays the image based on the acquired data. When the image processing unit 331 receives an instruction of the display of the image from the user (not illustrated) via, for example, the operating unit 312, the image processing unit 331 requests the data of the image from the image management server 200 via the communication unit 311. When the image processing unit 331 acquires the data of the image from the image management server 200, the image processing unit 331 displays the image on the display unit 313. Further, the image processing unit 331 may be configured to display the image by using a dedicated application by operating the dedicated application that does not permit the duplication of an image.

<Flow of the Processing>

Figure 10:
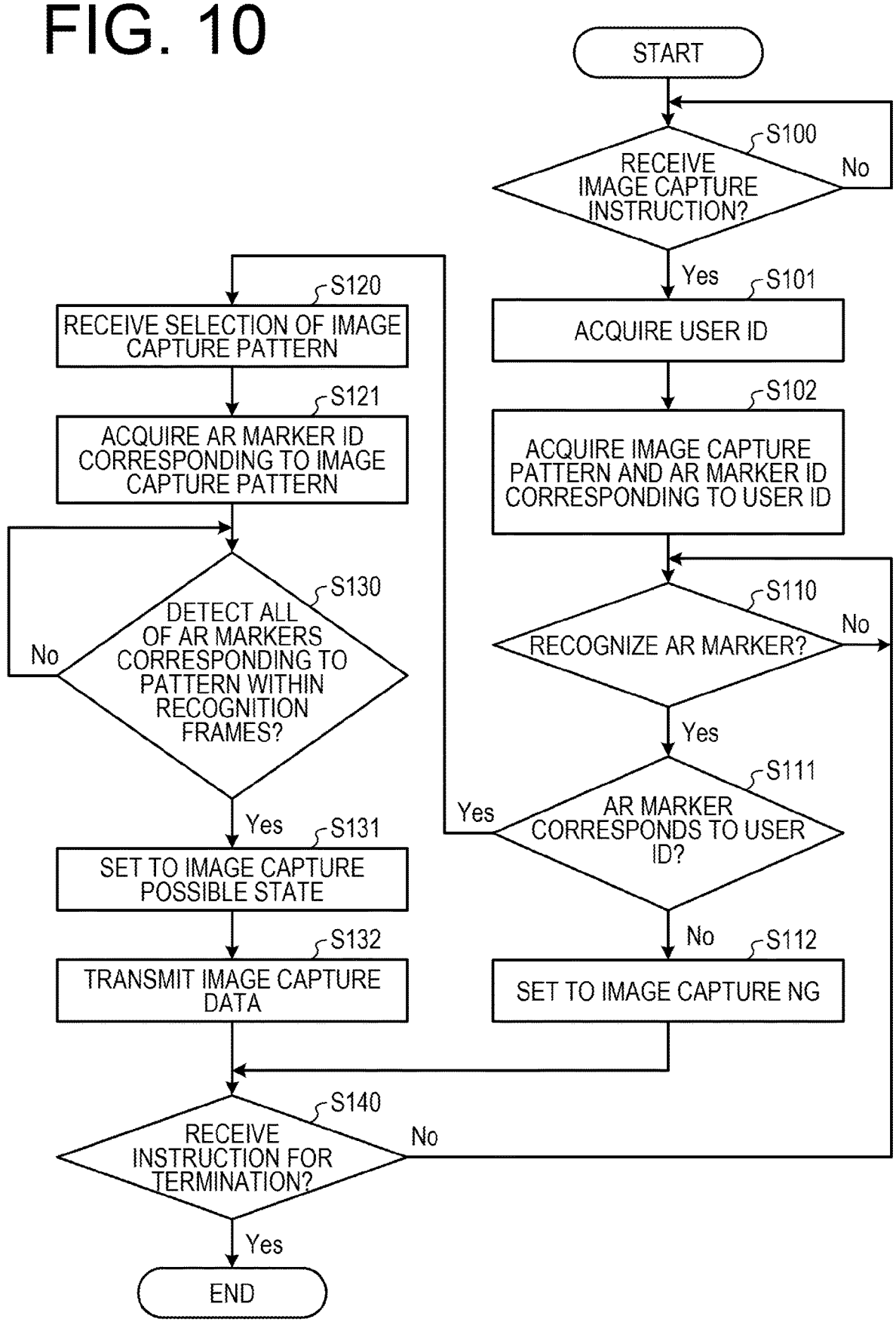
FIG. 10 is a flowchart illustrating an example of image capture processing by the image capture device according to the first embodiment.
Figure 11:
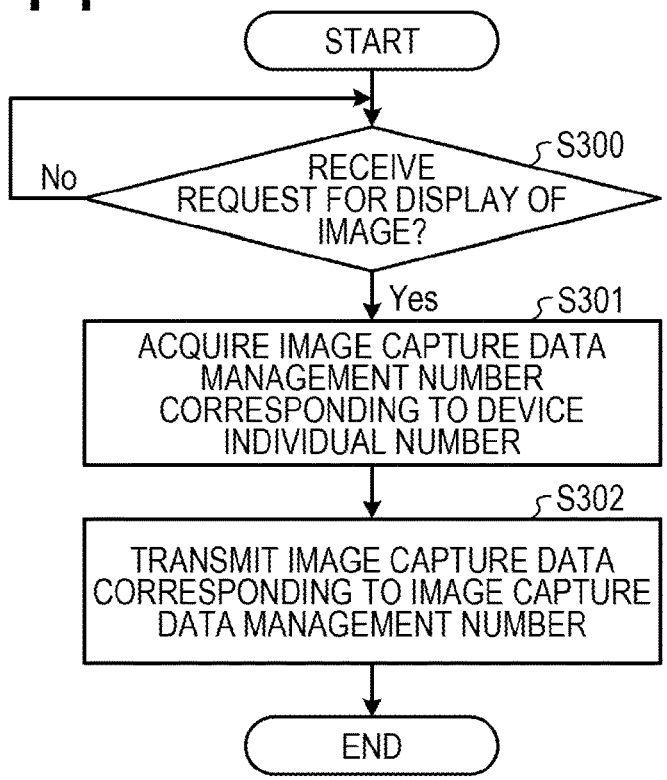
FIG. 11 is a flowchart illustrating an example of image display processing according to the first embodiment.

Next, a flow of the processing in the present embodiment will be described with reference to FIGS. 10 and 11. FIG. 10 is a flowchart illustrating an example of image capture processing by the image capture device according to the first embodiment. As illustrated in FIG. 10, the information acquiring unit 131 of the image capture device 100 stands by until an image capture instruction is received from a user (not illustrated) via, for example, the operating unit 112 (S100: "No").

When the information acquiring unit 131 determines that the image capture instruction is received (S100: "Yes"), the information acquiring unit 131 acquires a user ID input through the operating unit 112 (S101). Further, the information acquiring unit 131 transmits a request for information used for image capturing to the image management server 200.

The information acquiring unit 131 acquires an image capture pattern corresponding to the user ID and an AR marker ID from the image management server 200, and stores the acquired image capture pattern and AR marker ID in the memory unit 120 (S102). Next, the marker recognizing unit 132 displays an image acquired from the camera 113 on the display unit 114, and repeats the acquisition of the image until the AR marker is recognized from the image acquired from the camera 113 (S110: No).

When the marker recognizing unit 132 determines that the AR marker is recognized from the image acquired from the camera 113 (S110: "Yes"), the marker recognizing unit 132 determines whether the recognized AR marker corresponds to the user ID (S111). For example, the marker recognizing unit 132 determines whether the AR marker ID acquired from the image management server 200 in accordance with the user ID matches the AR marker ID of the recognized AR marker.

When the marker recognizing unit 132 determines that the recognized AR marker does not correspond to the user ID (S111: "No"), the marker recognizing unit 132 sets the image including the recognized AR marker to image capture NG (S112). In this case, the marker recognizing unit 132 does not activate the image capture button 2500 of the captured image illustrated in FIG. 3. Then, the processing progresses operation S140.

In the meantime, when the marker recognizing unit 132 determines that the recognized AR marker corresponds to the user ID (S111: "Yes"), the marker recognizing unit 132 receives a selection of an image capture pattern corresponding to the recognized AR marker through the operating unit 112 (S120). Then, the marker recognizing unit 132 acquires the AR marker ID corresponding to the selected image capture pattern from the memory unit 120 (S121). Further, the marker recognizing unit 132 displays the captured image corresponding to the image capture pattern on the display unit 114.

Next, the marker recognizing unit 132 repeats the acquisition of the image from the camera 113 until the AR marker corresponding to the image capture pattern is detected within a recognition frame (S130: "No"). When the marker recognizing unit 132 determines that all of the AR markers corresponding to the image capture pattern is detected within the recognition frames (S130: "Yes"), the marker recognizing unit 132 sets the captured image in an image capture possible state (S131). For example, the image capture processing unit 133 activates the image capture button 2500 of the captured image illustrated in FIG. 3.

When the image capture processing unit 133 receives an operation of the image capture button 2500, the image capture processing unit 133 transmits data of the captured image to the image management server 200 (S132). Then, the image capture processing unit 133 determines whether an instruction of an image capture termination is received from the user via the operating unit 112 (S140). When the image capture processing unit 133 determines that the instruction of the image capture termination is not received from the user (S140: "No"), the processing returns to operation S110 and the processing is repeated. In the meantime, when the image capture processing unit 133 determines that the instruction of the image capture termination is received from the user (S140: "Yes"), the processing is terminated.

Next, a flow of image display processing by the image management server 200 in the case where the request for the image display is received from the display device 300 will be described. FIG. 11 is a flowchart illustrating an example of image display processing according to the first embodiment. First, the image output unit 233 of the image management server 200 stands by until an image display request is received from the display device 300 via the communication unit 211 (S300: "No").

When the image output unit 233 receives the image display request from the display device 300 (S300: "Yes"), the image output unit 233 acquires an image capture data management number corresponding to a device individual number of the display device 300 (S301). Next, the image output unit 233 extracts image capture data corresponding to the acquired image capture data management number from the memory unit 220 and transmits the extracted image capture data to the display device 300 (S302), and terminates the processing.

Effect

As described above, the image capture device in the present embodiment includes the acquiring unit that acquires one or more patterns which designates an image capture permitted range predetermined for each image capture object, and the marker information recognizing unit that displays one or more frames corresponding to any one of the one or more patterns. The image capture device further includes the image capture processing unit which determines whether the image capture permitted range is satisfied based on a location relation between the one or more elements of marker information specifying the location of the image capture object and the one or more frames, and permits image capturing. Accordingly, the image capture object may be limited. For example, according to the present embodiment, it is possible to prevent other devices from being reflected on the back of a specific server rack.

The image capture device in the present embodiment displays the one or more patterns in the display image to be selectable, and displays the one or more frames corresponding to the selected pattern in the display image. Accordingly, even though the image capture objects are the same, the image capture range may be limited with different patterns.

When it is determined that the image capture permitted range is satisfied based on the location relation between the one or more elements of marker information and the one or more frames, the image capture device in the present embodiment permits the operation of the image capture button displayed in the display image. Accordingly, it is possible to suppress image capturing of the range other than the image capture permitted range.

The image capture device in the present embodiment further includes the memory unit which stores the data of the captured image by using any one of the selected one or more patterns. The image capture device transmits the stored data of the image to the image management server and deletes the data of the image from the memory unit. Accordingly, it is possible to suppress the image from being leaked from the image capture device.

The image management server in the present embodiment transmits one or more patterns designating an image capture permitted range, which is predetermined for each image capture object and includes information on a frame of the one or more elements of marker information, to the image capture device. The image management server in the present embodiment receives data of an image in which the image capture permitted range is captured from the image capture device, and associates the received data of the image with information identifying one or more display devices permitting the display of the image and stores the data of the image. When the image management server in the present embodiment receives a request for an image display from the display device, the image management server transmits the data of the image stored in association with identification information of the display device to the display device as data in a manner in which an image cannot be duplicated. Accordingly, it is possible to limit an image capture object by the image capture device. Further, when the image is displayed, it is possible to suppress the image from being leaked.

Second Embodiment

However, the embodiment of the present disclosure has been described, but the present disclosure may be carried out in other various forms in addition to the foregoing embodiment. For example, the configuration in which the user information master 221 stores the plurality of image capture patterns and the marker recognizing unit 132 selects one of the plurality of image capture patterns has been described, but the embodiment is not limited thereto. For example, the user information master 221 may be configured so that only one image capture pattern is registered for one user. Further, the image management server 200 may be configured not to include the user information master 221 and a common image capture pattern may be configured to be applied to all of the users.

The configuration in which the marker recognizing unit 132 determines whether the recognized AR marker matches the image capture pattern has been described, but the embodiment is not limited thereto. For example, the marker recognizing unit 132 may be configured to transmit information on the AR marker to the image management server 200, and the image management server 200 may be configured to perform the processing of determining whether the recognized AR marker matches the image capture pattern.

The image captured by the image capture device 100 is, for example, a still image, but is not limited thereto, and the image capture device 100 may be configured to capture a moving image and transmit the captured moving image to the image management server 200.

The captured image illustrated in FIG. 3 is an example, and a captured image in other forms may be displayed. For example, in the captured image, the range other than the range corresponding to the image capture pattern may be excluded from the display object in the display image.

Figure 12:
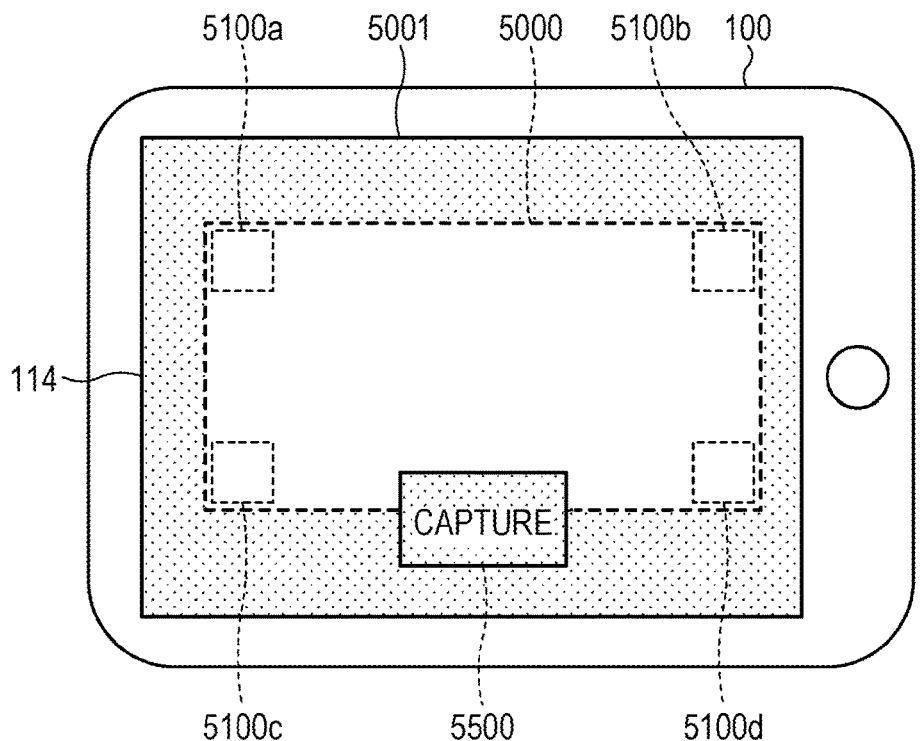
FIG. 12 is a diagram illustrating an example of an image capture device displaying a captured image according to a second embodiment.

An example of the captured image in the present embodiment will be described with reference to FIG. 12. FIG. 12 is a diagram illustrating an example of an image capture device displaying a captured image according to the second embodiment. As illustrated in FIG. 12, a captured image in the present embodiment includes recognition frames 5100a to 5100d and an image capture button 5500 similar to the captured image illustrated in FIG. 3. However, the captured image in the present embodiment is different from the captured image illustrated in FIG. 3 according to the first embodiment in that a portion 5001 other than an image capture range corresponding to an image capture pattern 5000 is mask-processed (e.g., color mask processing or mosaic processing, but the mask processing is not limited thereto). That is, in the captured image in the present embodiment, only an image capture range corresponding to the image capture pattern is displayed to be visually recognized. Accordingly, it is possible to more clearly present the image capture range to a user.

<System>

A portion of the processing which has been described as being automatically performed among the respective processing described in the present embodiment may also be manually performed. Otherwise, the entirety or a part of the processing described as being manually performed may also be automatically performed by a publicly known method. Besides, the processing sequence, the control sequence, the specific names, and the information including various data or parameters described or illustrated in the document or the drawings may be arbitrarily changed unless otherwise specified.

Each constituent element of each illustrated device is functionally conceptual, and is not essentially physically configured as illustrated in the drawing. That is, a specific form of dispersion or a combination of the respective devices is not limited to the illustration. That is, the entirety or the part of the devices may be configured to be functionally or physically dispersed and combined on a predetermined unit basis according to, for example, various loads, or a usage situation. Further, the entirety or a predetermined part of the processing functions performed by the devices respectively may be implemented by a CPU and a program interpreted and executed by the CPU or may be implemented by hardware by wired logic.

Figure 13:
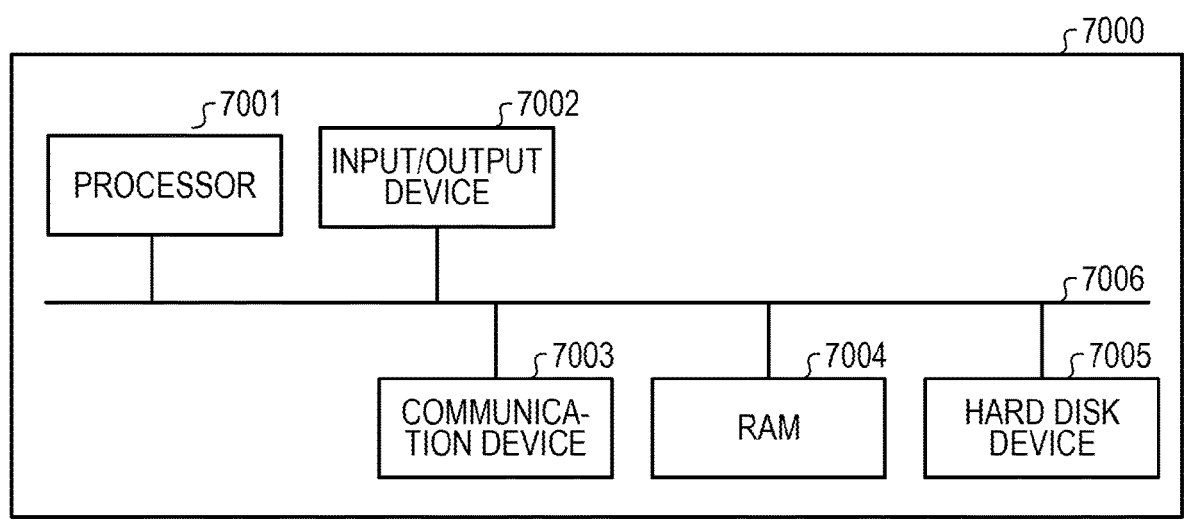
FIG. 13 is a diagram illustrating an example of a configuration of hardware.

Various processing described in the embodiments may be implemented by executing a program, which is prepared in advance, in a computer. Accordingly, hereinafter, an example of a computer executing a program having the same function as that of the embodiment will be described. FIG. 13 is a diagram illustrating an example of a configuration of hardware. The image management server 200 is implemented by, for example, the same hardware configuration as that of a computer 7000 illustrated in FIG. 13. Further, the image capture device 100 and the display device 300 may be implemented by a computer having, for example, a camera function in addition to the same hardware configuration.

As illustrated I FIG. 13, the computer 7000 includes a processor 7001 which executes various calculation processing, an input/output device 7002, and a communication device 7003 to be connected with a portable terminal and a station device via a wire or wirelessly. Further, the computer 7000 includes a RAM 7004 which temporarily stores various information, and a hard disk device 7005. Further, each of the devices 7001 to 7005 is connected to a bus 7006.

In the hard disk device 7005, an image management program having the same function as that of the processing unit of each of the information output unit 231, the image receiving unit 232, and the image output unit 233 represented in each of the embodiments is stored. Further, in the hard disk device 7005, the user information master 221, the AR marker management master 222, the image capture pattern master 223, and the image capture data management master 224 are stored. In the hard disk device 7005, various data for implementing the image management program are stored.

The processor 7001 reads each program stored in the hard disk device 7005 and develops and executes the read program in the RAM 7004 to perform various processing. Further, the programs may enable the computer 7000 to serve as the information output unit 231, the image receiving unit 232, and the image output unit 233 represented in each of the embodiments. Further, each program may not be necessarily stored in the hard disk device 7005. For example, the computer 7000 may read and execute a program stored in a recording medium readable by the computer 7000.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to an illustrating of the superiority and inferiority of the invention. Although the embodiments of the present invention have been described in detail, it should be understood that the various changes, substitutions, and alterations could be made hereto without departing from the spirit and scope of the invention.

What is claimed is:

1. An image capture device, comprising:
 a memory; and
 a processor coupled to the memory and the processor configured to:
 acquire one or more marker patterns predetermined for each image capture object;
 display a camera image outputted from a camera so that one or more frame patterns are imposed on the camera image, the one or more frame patterns corresponding to any of the one or more marker patterns; and
 suppress capturing of a first camera image when a location relation between a first marker pattern and a first frame pattern in the first camera image is not satisfied, the first marker pattern being detected in the first camera image and corresponding to a first image capture object, the first frame pattern being imposed on the first camera image and corresponding to the first marker pattern.

2. The image capture device according to claim 1, wherein the processor is further configured to:
 cause the one or more marker patterns to be displayed in a display image to be selectable, and
 cause a frame pattern of the one or more frame patterns that corresponds to a selected marker pattern among the one or more marker patterns to be displayed in the display image.

3. The image capture device according to claim 2, wherein the processor is further configured to:
 permit an operation of an image capture button displayed in the display image, when it is determined that the location relation between the first marker pattern and the first frame pattern is satisfied.

4. The image capture device according to claim 2, wherein the processor is further configured to:
 store data of an image captured by using the selected marker pattern; and
 transmit the stored data of the image to an image management server and deletes the data of the image.

5. The image capture device according to claim 2, wherein the processor is further configured to:
 exclude a portion other than a portion of an image capture permitted range that includes the one or more frame patterns from a display object in the display image.

6. A non-transitory computer-readable recording medium having stored therein an image capture control program that causes a computer to execute a process, the process comprising:
 acquiring one or more marker patterns predetermined for each image capture object;
 displaying a camera image outputted from a camera so that one or more frame patterns are imposed on the camera image, the one or more frame patterns corresponding to any of the one or more marker patterns; and
 suppressing capturing of a first camera image when a location relation between a first marker pattern and a first frame pattern in the first camera image is not satisfied, the first marker pattern being detected in the first camera image and corresponding to a first image capture object, the first frame pattern being imposed on the first camera image and corresponding to the first marker pattern.

7. An image capture management system, comprising:
 an image capture device; and
 an image management server; and wherein
 the image capture device includes:
 a first memory; and
 a first processor coupled to the first memory and the first processor configured to:
 acquire one or more marker patterns predetermined for each image capture object from the image management server;
 display a camera image outputted from a camera so that one or more frame patterns are imposed on the camera image, the one or more frame patterns corresponding to any of the one or more marker patterns; and
 permit suppress capturing of a first camera image when a location relation between a first marker pattern and a first frame pattern in the first camera image is not satisfied, the first marker pattern being detected in the first camera image and corresponding to a first image capture object, the first frame pattern being imposed on the first camera image and corresponding to the first marker pattern, and
 the image management server includes:
 a second memory; and
 a second processor coupled to the second memory and the second processor configured to:
 transmit the one or more marker patterns to the image capture device.

8. The image capture management system according to claim 7, wherein
 the second processor is further configured to:
 receive data of the image in which the one or more marker patterns are captured from the image capture device;
 store the received data in the second memory in association with information that identifies first display devices of one or more display devices, the first display devices being permitted to display the image; and transmit, when a request for displaying the image is received from the first display devices, the data of the image stored in the second memory in association with the identification information of the first display devices to the first display devices.

9. The image capture management system according to claim 7, further comprising:

one or more display devices each include:

a third memory; and a third processor coupled to the third memory and the third processor configured to:

transmit a request for displaying an image to the image management server, and display the image received from the image management server in a manner in which duplication is impossible.

* * * * *